US010096263B2

(12) United States Patent
Jain et al.

(10) Patent No.: US 10,096,263 B2
(45) Date of Patent: Oct. 9, 2018

(54) IN-VEHICLE TUTORIAL (71) Applicant: Ford Global Technologies, LLC, Dearborn, MI (US)

(72) Inventors: Jinesh J Jain, San Mateo, CA (US); Daniel Levine, San Mateo, CA (US); Kyu Jeong Han, Palo Alto, CA (US); Gintaras Vincent Puskorius, Novi, MI (US)

(73) Assignee: FORD GLOBAL TECHNOLOGIES, LLC

( * ) Notice: Subject to any disclaimer, the term of this patent is extended or adjusted under 35 U.S.C. 154(b) by 456 days.

(21) Appl. No.: 14/843,471

(22) Filed: Sep. 2, 2015

(65) Prior Publication Data
US 2017/0061826 A1   Mar. 2, 2017

(51) Int. Cl.
*G09B 19/16* (2006.01)
*G09B 5/06* (2006.01)

(52) U.S. Cl.
CPC ............. *G09B 19/167* (2013.01); *G09B 5/06* (2013.01)

(58) Field of Classification Search
CPC ................................ G09B 19/167; G09B 5/06
USPC ............................................................ 434/66
See application file for complete search history.

(56) References Cited

U.S. PATENT DOCUMENTS

| 7,822,613 B2 | 10/2010 | Matsubara et al. |
| 8,606,516 B2 | 12/2013 | Vertelney et al. |
| 8,694,203 B2 | 4/2014 | Chen et al. |
| 2004/0036601 A1* | 2/2004 | Obradovich ............ B60C 23/04 340/540 |
| 2013/0041580 A1 | 2/2013 | Petrucci et al. |
| 2013/0143181 A1 | 6/2013 | Greenberg et al. |
| 2015/0262484 A1* | 9/2015 | Victor .................... G09B 19/16 701/1 |

FOREIGN PATENT DOCUMENTS

WO    WO-2014042571 A1    3/2014

* cited by examiner

*Primary Examiner* — Robert P Bullington
(74) *Attorney, Agent, or Firm* — David R. Stevens; Stevens Law Group (57) ABSTRACT Methods, devices, and systems pertaining to in-vehicle tutorials are described. A method may involve receiving a request for an in-vehicle tutorial of an operational feature of a vehicle from a user and simulating expected driving behavior corresponding to the operational feature in the vehicle. The method may further include monitoring operational behavior of the user, comparing the operational behavior with the expected driving behavior, and providing a feedback to the user based on the comparison.

15 Claims, 4 Drawing Sheets

IN-VEHICLE TUTORIAL

TECHNICAL FIELD

The present disclosure generally relates to automotive technologies and, more particularly, to methods and systems for in-vehicle tutorials.

BACKGROUND

New and valuable technologies are continually being introduced into today's cars. Technologies that are not well communicated often go unused. Also, users may not use the technologies as intended by the manufacturer. While car manuals may contain detailed instructions, users may find consultation with the manual unintuitive and inconvenient. Sometimes, instructions on how to use the technologies may be provided to the users at the point of sale (e.g., dealerships). However, explanation of technologies at the point of sale tends to be limited (e.g., as it is a one-time event) and the effectiveness depends largely on the degree to which the salesperson has been educated on the technologies.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Implementations herein relate to methods and systems for in-vehicle tutorials. The implementations present technologies to a user in a vehicle, e.g., the driver or a passenger of the vehicle, by leveraging multiple modes of communications, such as audio and lighting cues, as well as animations on an in-vehicle display system. Implementations in accordance with the present disclosure help introducing new features of the vehicle to the user when the introduction is requested or when a certain condition is triggered. Advantageously, the user may follow an in-vehicle tutorial at a pace of the user and therefore the user is provided an intuitive and immersive experience that enables a deeper understanding, learning and appreciation of the features.

Figure 1:
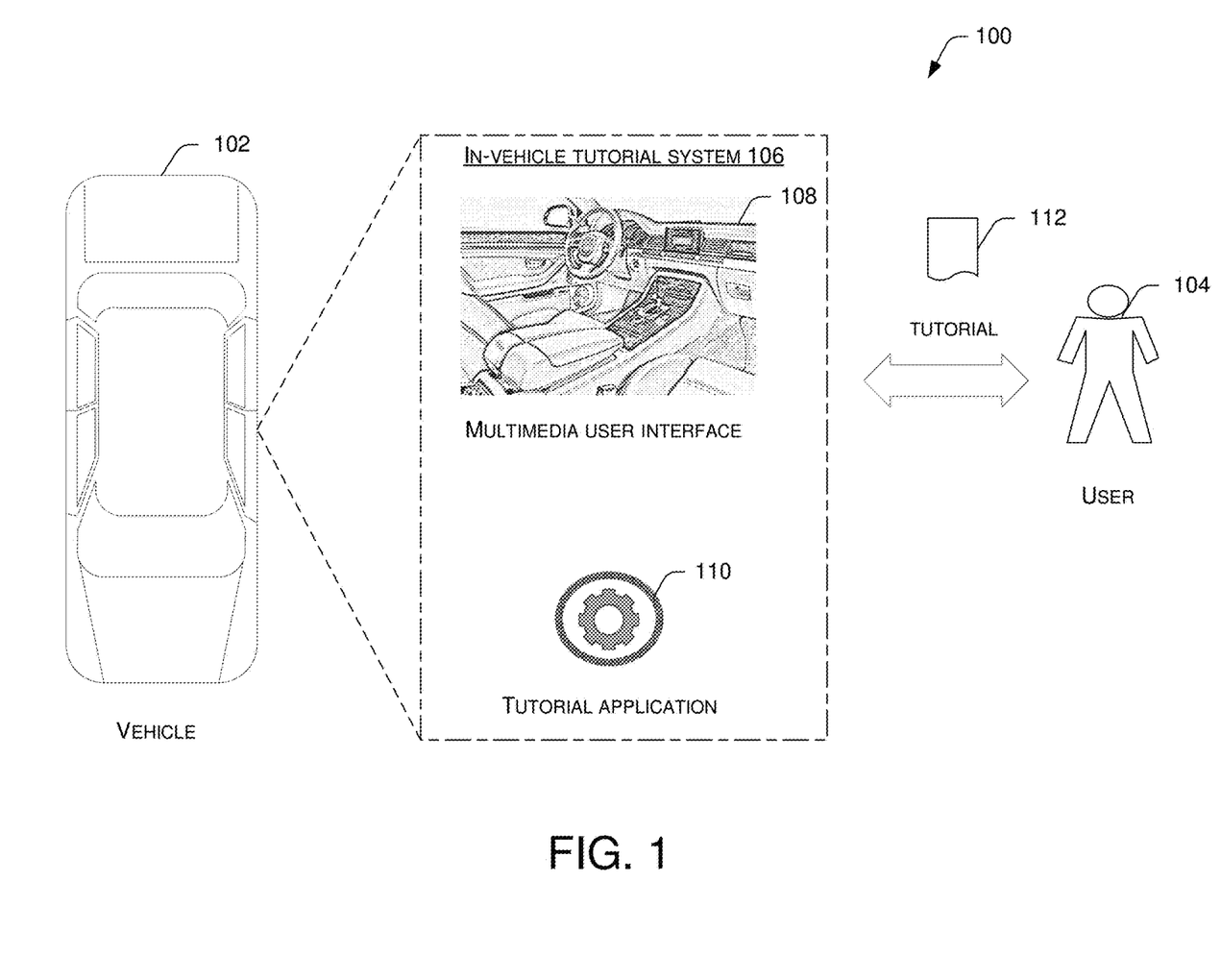
FIG. 1 is a diagram depicting an example environment in which example embodiments of the present disclosure may be implemented.

FIG. 1 illustrates a computing environment 100 that enables in-vehicle tutorials. The computing environment 100 includes a vehicle 102 and a user 104 of vehicle 102, e.g., a driver or passenger of vehicle 102. Vehicle 102 includes an in-vehicle tutorial system 106 that provides a tutorial of one or more operational features of vehicle 102 to user 104. In accordance with various embodiments, in-vehicle tutorial system 106, in a basic configuration, may include a multimedia user interface 108 and a tutorial application 110, each discussed in turn below.

Multimedia user interface 108 may be configured to enable multiple modes of communications between in-vehicle tutorial system 106 and user 104 via, for example, audio and lighting cues as well as animations on an in-vehicle display system. For example, multimedia user interface 108 may provide an in-vehicle tutorial 112 and other information, indications and messages to user 104 in the form of an audible, audio, voice, visual, video and/or haptic signal. Through multimedia user interface 108, tutorial application 110 may interact with user 104 to provide in-vehicle tutorial 112.

Tutorial application 110 may be configured to provide tutorial 112 in vehicle 102 to user 104 by leveraging multiple modes of communications. In some implementations, tutorial application 110 may receive a request from user 104, e.g., via multimedia user interface 108, for tutorial 112 on one or more of a number of operational features associated with vehicle 102. The request may be in the form of voice command, a touch to a touch-sensing panel of multimedia user interface 108, a wireless signal, or any other user-input mechanisms. For example, an operational feature may be an adaptive cruise control (ACC) feature, a hill descent control (HDC) feature, a lane keeping assistance (LKA) feature, a basic park assistance (PA) feature, a lane departure warning (LDW) feature of vehicle 102, a change in one or more settings related to a component of vehicle 102 (e.g., any change in the settings of an infotainment system of vehicle 102), a learning feature about an advanced driver assistance system (ADAS), or an autonomous vehicle feature (e.g., autonomous vehicle hand-off between vehicle 102 and user 104). The tutorial 112 may include multiple tutorial instructions that indicate or suggest expected driving behavior of user 104 to use one or more operational features of vehicle 102.

In some implementations, tutorial application 110 may simulate expected driving behavior corresponding to an operational feature using the multiple modes of communications, and monitor actual operational behavior of user 104. For example, the expected driving behavior may be indicated or suggested by a tutorial instruction of tutorial 112, e.g., via an audible, audio, voice, visual, video or haptic indication. Further, tutorial application 110 may compare the operational behavior of user 104 with the expected driving behavior of user 104. Based on the comparison, tutorial application 110 may provide feedback to user 104 using the multiple modes of communications. For example, in an event that the monitored or actual operational behavior of user 104 differs or deviates from the expected driving behavior, tutorial application 110 may provide an indication, e.g., via an audible, audio, voice, visual, video or haptic indication, to alert user 104 of such difference or deviation. Thus, user 104 may be made aware of the difference or deviation and, in response, make adjustment to his/her operational behavior with respect to the particular operational feature in concern. Accordingly, user 104 may learn from this experience and improve his/her proficiency and knowledge in terms of using the particular operational feature of vehicle 102.

In some implementations, tutorial application 110 may detect a driving context corresponding to the operational feature of vehicle 102, e.g., HDC. Tutorial application 110 may initiate tutorial 112 of an operational feature to provide a corresponding tutorial to user 104, e.g., via multimedia user interface 108. Further, tutorial application 110 may monitor driving behavior of user 104 during the proceeding of tutorial 112, and compare the driving behavior of user 104 with expected driving behavior corresponding to the operational feature. Based on the comparison, tutorial application 110 may provide feedback to user 104 using the multiple modes of communications.

Figure 2:
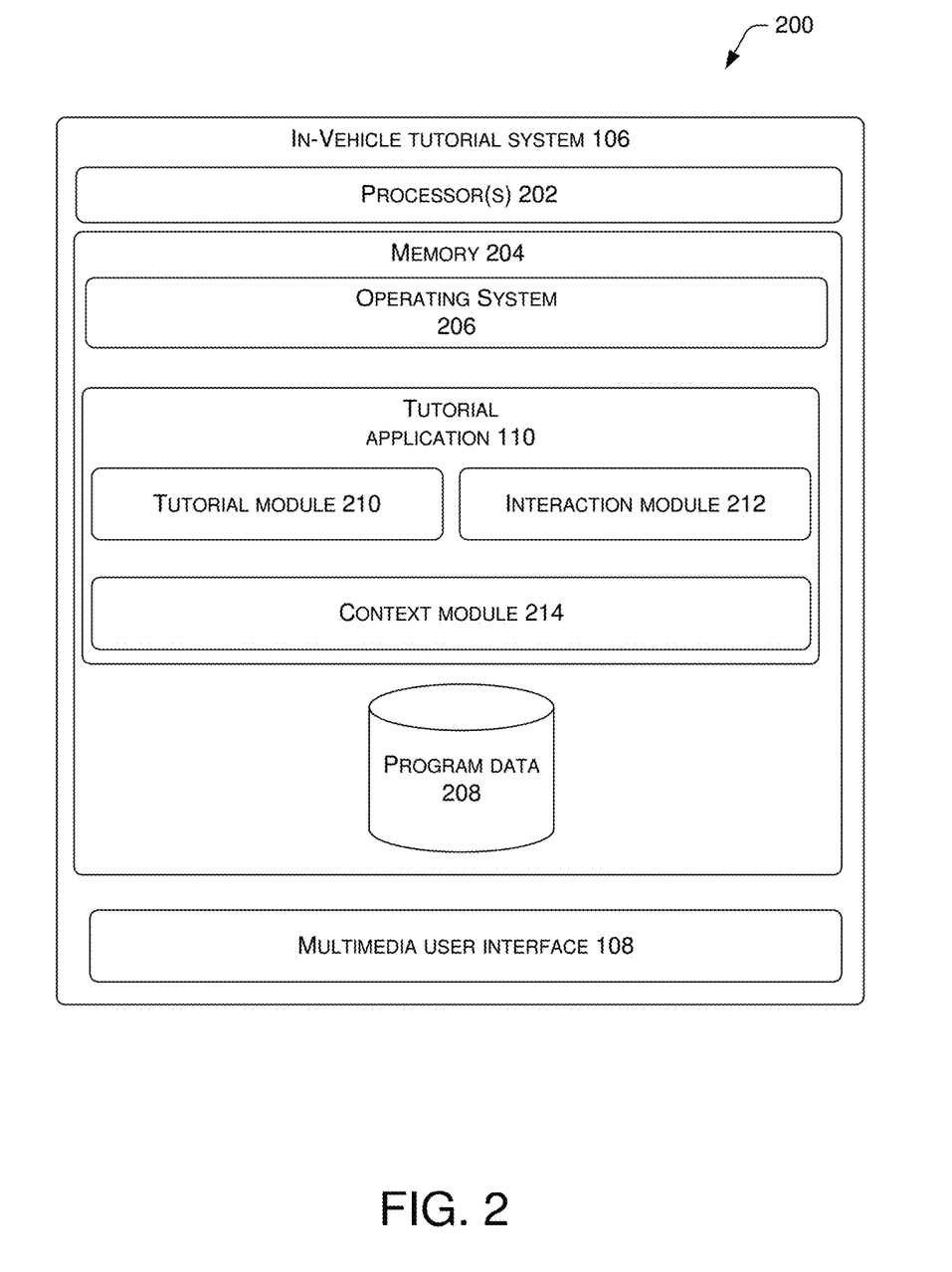
FIG. 2 is a block diagram depicting an example apparatus in accordance with an embodiment of the present disclosure.

FIG. 2 illustrates an illustrative computing apparatus 200 of in-vehicle tutorial system 106 that enables in-vehicle tutorials. The computing apparatus 200 shows additional details of in-vehicle tutorial system 106, which may include additional modules, kernels, data, and/or hardware.

In-vehicle tutorial system 106 may include processor(s) 202 and memory 204. The memory 204 may store various modules, applications, programs, or other data. The memory 204 may store instructions that, when executed by the processor(s) 202, cause the processor(s) 202 to perform the operations described herein for in-vehicle tutorial system 106. In some implementations, processor(s) 202 may include one or more graphics processing units (GPU) and one or more central processing units (CPU).

In-vehicle tutorial system 106 may have additional features and/or functionalities. For example, in-vehicle tutorial system 106 may include additional data storage devices (removable and/or non-removable) including computer-readable media. Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by in-vehicle tutorial system 106. Any such computer storage media may be part of in-vehicle tutorial system 106. Moreover, the computer-readable media may include computer-executable instructions that, when executed by the processor(s), perform various functions and/or operations described herein.

Memory 204 may store an operating system 206 as well as various components including, for example, tutorial application 110 and program data 208. For example, program data 208 may store one or more sets of instructions and/or multimedia interaction data pertaining to tutorial 112. Tutorial 112 may include a number of specific tutorials on a corresponding number of operational features of vehicle 102.

Tutorial application 110 may include various modules including, for example, a tutorial module 210, an interaction module 212 and a context module 214.

Interaction module 212 may be configured to receive a request from user 104 for tutorial 112 of an operational feature of vehicle 102. The operational feature may include ordinary in-vehicle capabilities such as climate and radio adjustment and may further include other vehicle features that involve multiple stages of operation. For example, operational features of vehicle 102 may include an ACC feature, a HDC feature, an LKA feature, a PA feature, an LDW feature, a change in one or more settings related to a component of vehicle 102 (e.g., any change in the settings of an infotainment system of vehicle 102), a learning feature about an ADAS, or an autonomous vehicle feature (e.g., autonomous vehicle hand-off between vehicle 102 and user 104). Depending on the operational feature being demonstrated, tutorial 112 may explain, for example in simple terms, the steps of operation for the particular operational feature (e.g., expected driving behavior), applicability of the feature, and expected benefits to user 104 deriving from the particular operational feature (e.g., safety and/or comfort). For some features (e.g., changing certain settings in vehicle 102), tutorial 112 may present step-by-step guidance towards a goal. For example, a series of animations may be presented via multimedia user interface 108 to user 104 to demonstrate an operational feature of vehicle 102 and associated benefit(s). In some implementations, interaction module 212 may be capable of speech recognition and natural language processing to receive voice commands and inquiries from user 104 for tutorial help such as, for example, "How do I change the tires on my car", "How do I fill gas?", "How do I check the tire pressure?" and the like.

Tutorial module 210 may be configured to simulate the expected driving behavior corresponding to the operational feature of vehicle 102. For example, tutorial module 210 may simulate the expected driving behavior corresponding to the operational feature of vehicle 102 with one or more notifications in the form of one or more audible, audio, voice, visual, video and/or haptic signals including lighting, audio, and video signals.

Tutorial module 210 may further monitor operational behavior of user 104, and compare the operational behavior of user 104 with the expected driving behavior corresponding to the operational feature. Based on the comparison, tutorial module may generate and provide a feedback to user 104, e.g., via multimedia user interface 108.

Multimedia user interface 108 may be configured to display an animation with synchronized audio to user 104 and present one or more notifications including lighting, audio, and video signals to simulate the expected driving behavior corresponding to the operational feature. Multimedia user interface 108 may also be configured to provide a haptic signal, e.g., vibration on the steering wheel or another component of vehicle 102, as a form of notification to user 102. Further, multimedia user interface 108 may activate or otherwise turn on one or more lights of vehicle 102 in a demonstration indicating to user 104 the expected driving behavior corresponding to the operational feature of vehicle 102. In these instances, in-vehicle tutorial system 106 may rely on simple intuitive interactions between user 104 and multimedia user interface 108. For example, in-vehicle tutorial system 106 may implement initiation and continuation of dialogues between user 104 and multimedia user interface 108 using speech recognition and machine learning techniques. Accordingly, the dialogues may be established such as to be simple and precise as close as possible to a naturalistic dialogue between two people.

In some implementations, context module 214 may determine a status mode of vehicle 102. For example, the status mode of vehicle 102 may be either a parking mode or a drive mode. In response to a determination that the status mode is the parking mode (e.g., vehicle 102 is parked and not in motion), tutorial module 210 may simulate the expected driving behavior corresponding to the operational feature of vehicle 102. In response to a determination that the status mode is the drive mode (e.g., vehicle 102 is not parked and may or may not be in motion), tutorial module 210 may determine whether tutorial 112 is allowed in the drive mode due to safety concerns and/or relevant traffic rules. If tutorial 112 is not allowed in the drive mode, interaction module 212 may generate an error message and present the error message to user 104, e.g., in the form of an audible, audio, voice, visual, video and/or haptic signal. If tutorial 112 is allowed in the drive mode, interaction module 212 may present an instruction of tutorial 112 to user 104 via multimedia user interface 108. In some implementations, tutorial module 210 may initiate tutorial 112 based on a user request, and then terminate tutorial 112 either in response to a termination request from user 104 or without receiving a response from user 104 within a predetermined time period, e.g., 30 seconds, 1 minute, 3 minutes or any user-definable period.

Suppose that the operational feature includes an ACC. In a parking mode, tutorial application 110 may receive a request for a tutorial on operational feature ACC via multimedia user interface 108. Tutorial application 110 may present an animation with synchronized audio to user 104 via multimedia user interface 108. The animation may contain small icons that user 104 may "click on" to resolve further questions or acquire further technical detail regarding the operational feature. For example, similar support may be included with an audio dialog tree. The backlights on the dashboard of vehicle 102 may also light up or blink along with the demonstration to indicate to user 104 the expected driving behavior corresponding to the operational feature of ACC on vehicle 102 while the ACC feature is activated or otherwise turned on. Accordingly, user 104 may expect certain behaviors in vehicle 102 while using and being aware of the operational feature of ACC.

In some implementations, context module 214 may detect a driving context corresponding to an operational feature of a vehicle 102. In some implementations, the driving context may include a status mode of vehicle 102 and an operational context. The status mode may be either a parking mode or a drive mode. The driving context may include, for example, a landform that extends above a surrounding terrain, and the operational feature may include a HDC. The operational context may include, for example, at least one of the following: an environmental condition, a driving condition, a traffic condition and a geographic condition.

In some implementations, tutorial module 210 may initiate tutorial 112 of the operational feature to provide tutorial 112 to user 104 in vehicle 102. Tutorial module 210 may further monitor driving behavior of user 104, determine expected driving behavior corresponding to the operational feature, and compare the driving behavior of user 104 with the expected driving behavior. Based on the comparison, interaction module 212 may provide a feedback to user 104.

In some implementations, tutorial module 210 may request an approval for proceeding tutorial 112 from user 104 after initiating tutorial 112. If interaction module 212 receives the approval, tutorial module 210 may proceed with providing an instruction of tutorial 112.

Suppose that the operational feature includes HDC. In a drive mode, context module 214 may detect that vehicle 102 is traveling on a steep hill without HDC and that the steepness or slope of the hill is, for example, greater than a predetermined value. Over audio instruction, in-vehicle tutorial system 106 may begin a HDC tutorial. The HDC tutorial may instruct user 104 to brake at the top of the hill, enable the HDC (e.g., by depressing the button on the gear selector of vehicle 102), and release the brake slowly. At the bottom of the hill, the HDC tutorial may instruct user 104 to turn off the HDC. In some instances, the HDC tutorial may ask user 104 about whether HDC concept has been learned or if further an instruction is needed.

Figure 3:
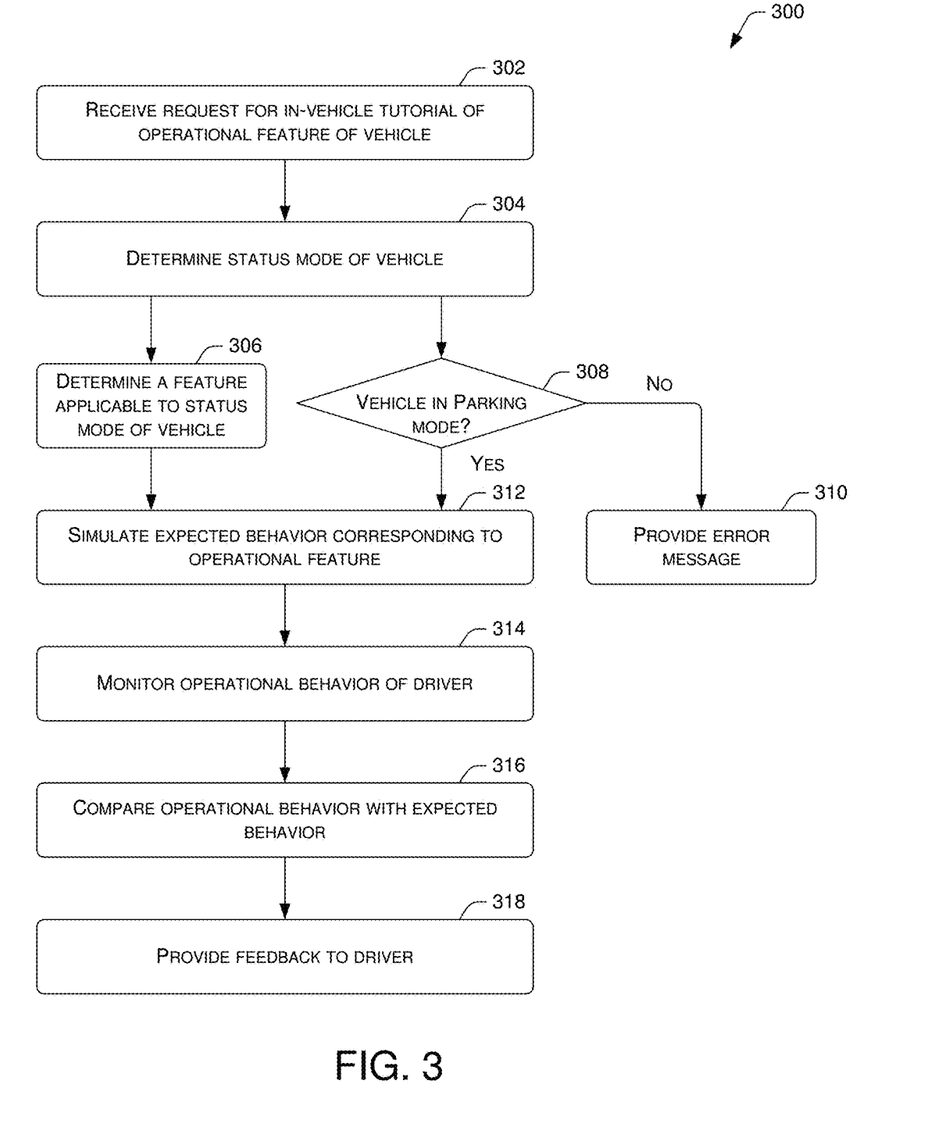
FIG. 3 is a flowchart of an example process in accordance with an embodiment of the present disclosure.

FIG. 3 illustrates an example process 300 in accordance with the present disclosure. Example process 300 may be one of various implementation scenarios based on example environment 100, and is provided solely for illustrative purpose so that those skilled in the art may better appreciate benefits and advantages provided by the present disclosure. Therefore, the scope of the present disclosure is not limited by example process 300. For illustration purpose and not limiting the scope of the present disclosure, the description of example process 300 is provided below in the context of implementation using processor 202 of computing apparatus 200 with respect to vehicle 102. Example process 300 may begin at 302.

At 302, processor 202 may receive a request for tutorial 112 of an operational feature of vehicle 102 from user 104. The operational feature may include ordinary in-vehicle capabilities such as climate and radio adjustment and may further include one or more other vehicle features that involve multiple stages of operation. Example process 300 may proceed from 302 to 304.

At 304, processor 202 may determine a status mode of vehicle 102. For example, the status mode of vehicle 102 may be either a parking mode or a drive mode. Example process 300 may proceed from 304 to 306. Alternatively, example process 300 may proceed from 304 to 308.

At 306, processor 202 may determine one or more features in context of (and hence applicable to) the determined status mode of the vehicle, whether it is the parking mode or drive mode, and proceed to 312 and simulate an expected driving behavior corresponding to the operational feature of the vehicle with respect to the determined feature. Example process 300 may then proceed from 312 to 314.

At 308, processor 202 may determine whether the status mode is a parking mode. Processor 202 may determine the status mode using various sensors associated with vehicle 102.

In response to a determination that the status mode is the parking mode (i.e., the "YES" branch of operation 308), processor 202 may proceed to 312 and simulate expected driving behavior corresponding to the operational feature of vehicle 102. For example, processor 202 may simulate expected driving behavior corresponding to the operational feature of vehicle 102 with one or more notifications including at least one of lighting, audio, and video signals. Example process 300 may then proceed from 312 to 314.

In response to a determination that the status mode is not the parking mode (i.e., the "NO" branch of operation 308), processor 202 may proceed to 310 and generate an error message. For example, processor 202 may determine that the status mode is a drive mode, processor 202 may generate an error message. In other implementations, the processor 202 may further determine whether tutorial 112 corresponding to the operational feature is allowed in status modes other than the parking mode. If the operational feature (e.g., HDC) is allowed in the status mode (e.g., a drive mode), processor 202 may proceed with tutorial 112.

At 314, processor 202 may monitor operational behavior of user 104. In some implementations, after processor 202 initiates tutorial 112, processor 202 may terminate tutorial 112 in response to failure of receiving a response from user 104 for a predetermined time period. Example process 300 may then proceed from 314 to 316.

At 316, processor 202 may compare the operational behavior with the expected driving behavior corresponding to the operational feature. For example, the expected driving behavior may be indicated or suggested by a tutorial instruction of tutorial 112. Example process 300 may then proceed from 316 to 318.

At 318, processor 202 may provide a feedback to user 104 based on the comparing. For example, processor 202 may present an animation with synchronized audio to user 104 in vehicle 102, and turn on one or more lights of the vehicle in a demonstration indicating to the expected driving behavior of user 104 corresponding to the operational feature of vehicle 102.

Figure 4:
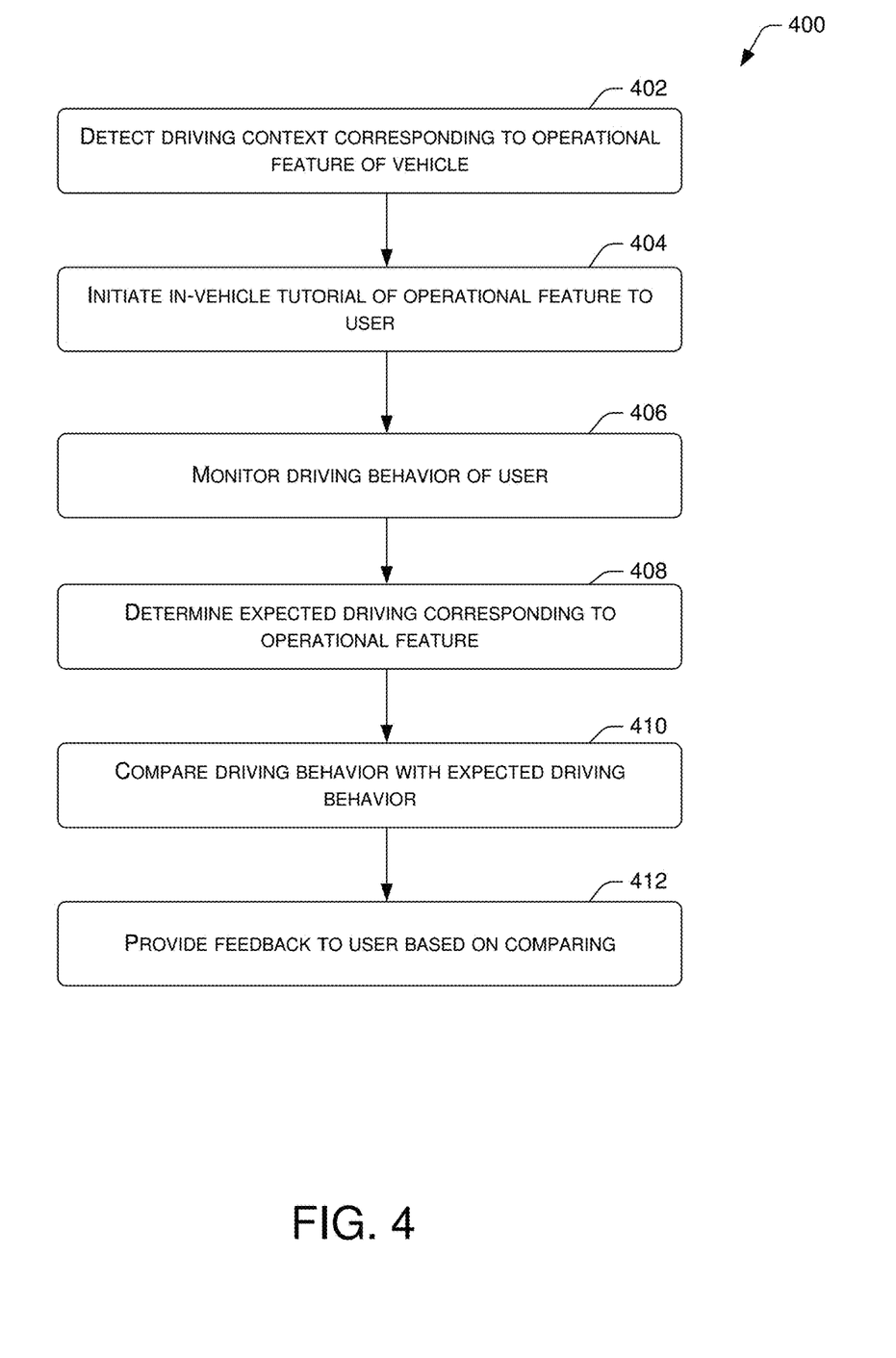
FIG. 4 is another flowchart of an example process in accordance with an embodiment of the present disclosure.

FIG. 4 is a diagram depicting an example process 400 in accordance with the present disclosure. Example process 400 may be one of various implementation scenarios based on example environment 100, and is provided solely for illustrative purpose so that those skilled in the art may better appreciate benefits and advantages provided by the present disclosure. Therefore, the scope of the present disclosure is not limited by example scenario 400. For illustration purpose and not limiting the scope of the present disclosure, the description of example process 400 is provided below in the context of implementation using processor 202 of computing apparatus 200 with respect to vehicle 102.

At 402, processor 202 may detect a driving context corresponding to an operational feature of vehicle 102. For example, the driving context may include a status mode of vehicle 102 and an operational context, and the status mode may be either a parking mode or a drive mode. In some implementations, the operational context may include at least one of an environmental condition, a driving condition, a traffic condition, or a geographic condition. For example, the driving context may include a landform that extends above a surrounding terrain, and the operational feature may include a HDC. Example process 400 may proceed from 402 to 404.

At 404, processor 202 may initiate tutorial 112 of the operational feature to provide tutorial 112 to user 104. For example, processor 202 may request an approval for tutorial 112 from user 104. In response to receiving the approval from the user 104, processor 202 may provide an instruction of tutorial 112 to user 104. Example process 400 may proceed from 404 to 406.

At 406, processor 202 may monitor driving behavior of user 104. For example, processor 202 may monitor driving behavior of user 104 by collecting driving data from various sensors (e.g., pressure or proximity sensors) and/or other devices (e.g., Global Positioning System (GPS)) associated with vehicle 102. In some implementations, one or more sensors may be utilized under the OpenXC architecture and connected to processor 202 and connected to an in-vehicle network such as, for example, a controller area network (CAN) bus, e.g., through on-board diagnostics (OBD) ports such as OBD2 ports, to monitor various parameters. Example process 400 may proceed from 406 to 408.

At 408, processor 202 may determine expected driving behavior corresponding to the operational feature. For example, the expected driving behavior may be stored in program data 208 of in-vehicle tutorial system 106. Example process 400 may proceed from 408 to 410.

At 410, processor 202 may compare the driving behavior with expected driving behavior corresponding to the operational feature. Example process 400 may proceed from 410 to 412.

At 412, processor 202 may provide a feedback to user 104 based on the comparing. The feedback may be presented via multimedia user interface 108.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method, comprising:
   receiving, by one or more processors, a request for an in-vehicle tutorial of an operational feature of a vehicle from a user;
   simulating, by the one or more processors, an expected driving behavior corresponding to the operational feature of the vehicle by controlling a multimedia user interface of the vehicle to perform a plurality of operations comprising:
      vibrating a steering wheel or another component of the vehicle;
      activating one or more lights of the vehicle; and
      engaging in a dialogue with the user using speech recognition and machine learning;
   monitoring an operational behavior of the user by communicating with a plurality of sensors of the vehicle that sense various parameters of the vehicle to collect sensor data from the plurality of sensors; comparing, by the one or more processors, the operational behavior with the expected driving behavior; and
   providing a feedback to the user based on the comparing.

2. The method of claim 1, wherein the simulating the expected driving behavior corresponding to the operational feature of the vehicle comprises simulating the expected driving behavior corresponding to the operational feature in the vehicle with one or more notifications comprising lighting, audio, and video signals.

3. The method of claim 1, wherein the operational feature comprises an adaptive cruise control (ACC), a hill descent control (HDC), a lane keeping assistance (LKA) feature, a basic park assistance (PA) feature, a lane departure warning (LDW) feature, a change in one or more settings related to a component of the vehicle, a learning feature about an advanced driver assistance system (ADAS), or an autonomous vehicle feature.

4. The method of claim 1, wherein the providing of the feedback based on the comparing comprises:
   presenting an animation with synchronized audio to the user; and
   activating one or more lights of the vehicle in a demonstration indicating the expected driving behavior corresponding to the operational feature of the vehicle.

5. The method of claim 1, wherein the simulating of the expected driving behavior corresponding to the operational feature of the vehicle comprises:
   determining a status mode of the vehicle, the status mode of the vehicle being one of a parking mode or a drive mode; and
   in response to the determining that the status mode is the parking mode, simulating the expected driving behavior corresponding to the operational feature of the vehicle.

6. The method of claim 5, further comprising:
   in response to the determining that the status mode is the drive mode, determining whether the in-vehicle tutorial is allowed in the drive mode;
   in response to the in-vehicle tutorial being not allowed in the drive mode:
      generating an error message; and
      presenting the error message to the user; and
   presenting an instruction of the in-vehicle tutorial to the driver in response to the in-vehicle tutorial being allowed in the drive mode.

7. The method of claim 1, wherein the simulating of the expected driving behavior corresponding to the operational feature of the vehicle comprises:
   determining a status mode of the vehicle, the status mode of the vehicle being one of a parking mode or a drive mode;
   determining another feature that is applicable to the status mode of the vehicle; and
   simulating the expected driving behavior corresponding to the operational feature of the vehicle with respect to the another feature.

8. The method of claim 1, further comprising:
   initiating the in-vehicle tutorial based on the request; and
   terminating the in-vehicle tutorial in response to a failure of receiving a response from the user within a predetermined time period.

9. A method comprising:
   detecting, by one or more processors of one or more computing apparatus, a driving context corresponding to an operational feature of a vehicle;
   initiating, by the one or more processors, an in-vehicle tutorial of the operational feature to a user of the vehicle by controlling a multimedia user interface of the vehicle to perform a plurality of operations comprising:
      vibrating a steering wheel or another component of the vehicle;
      activating one or more lights of the vehicle; and
      engaging in a dialogue with the user using speech recognition and machine learning;
   monitoring, by the one or more processors, a driving behavior of the user by communicating with a plurality of sensors of the vehicle that sense various parameters of the vehicle to collect sensor data from the plurality of sensors;
   comparing, by the one or more processors, the driving behavior of the user with an expected driving behavior corresponding to the operational feature; and
   providing, by the one or more processors, a feedback to the user based on the comparing.

10. The method of claim 9, further comprising:
    determining the expected driving behavior corresponding to the operational feature.

11. The method of claim 9, further comprising:
    requesting an approval for the in-vehicle tutorial from the user;
    receiving the approval from the user; and
    in response to the approval, providing an instruction of the in-vehicle tutorial to the user.

12. The method of claim 9, wherein the driving context comprises a status mode of the vehicle and an operational context, wherein the status mode being one of a parking mode or a drive mode.

13. The method of claim 12, wherein the operational context comprises at least one of an environmental condition, a driving condition, a traffic condition, or a geographic condition.

14. The method of claim 9, wherein the driving context comprises a landform that extends above a surrounding terrain, and wherein the operational feature comprises an adaptive cruise control (ACC), a hill descent control (HDC), a lane keeping assistance (LKA) feature, a basic park assistance (PA) feature, a lane departure warning (LDW) feature, a change in one or more settings related to a component of the vehicle, a learning feature about an advanced driver assistance system (ADAS), or an autonomous vehicle feature.

15. The method of claim 14, wherein the detecting of the driving context corresponding to the operational feature of the vehicle comprises:
   detecting that the vehicle is on a top of the landform, a slope of the landform greater than a predetermined value;
   determining that the HDC corresponds to the landform; and
   determining the in-vehicle tutorial for the HDC.

* * * * *